May 12, 1959

L. H. JOHNSON 2,886,757

TAPE RECORDER DRIVE

Filed Aug. 27, 1956

INVENTOR.
LENARD H. JOHNSON

BY

Christie, Parker & Hale
ATTORNEYS

United States Patent Office 2,886,757 Patented May 12, 1959

2,886,757

TAPE RECORDER DRIVE

Lenard H. Johnson, Pasadena, Calif., assignor to Consolidated Electrodynamics Corporation, Pasadena, Calif., a corporation of California Application August 27, 1956, Serial No. 606,414

2 Claims. (Cl. 318—318)

This invention relates to speed regulated driving systems and, more particularly, is concerned with apparatus for regulating the speed of a magnetic tape recorder.

In magnetic tape recording work it is desirable on play-back to move each bit of recorded information past the play-back head at the same rate at which these bits of information were recorded at the recording head. Due to irregularities in the movement of the tape during recording and play-back, and due to stretching of the tape after information has been recorded on it, some arrangement for speeding up and slowing down the movement of the tape during play-back is necessary in order to compensate for these effects.

The speed of the tape may be controlled by providing a signal having a constant frequency and recording it as a reference frequency signal on the tape along with the other recorded information. One such speed control system is described in co-pending application Serial No. 451,029 filed August 19, 1954, now Patent No. 2,798,998, in the name of Monte L. Marks. In the invention therein described, a vibrator-driven switch alternately samples a signal from a local reference oscillator and the reference signal derived from the tape, the difference in frequency of the sample signals being utilized to control a servo motor for regulating the speed of the tape accordingly.

The present invention provides an improved circuit for controlling the servo motor to regulate the speed of the tape in response to the frequency of the reference signal recorded on the tape. The circuit is characterized in that it is more sensitive to slight variations in frequency of the reference signal from the tape, has a higher speed of response for correcting for such variations, yet is simple in its circuitry and construction.

In brief, the invention contemplates a tape drive system including a servo motor coupled to a capstan which drives the tape. The servo motor is controlled in response to the reference signal recorded on the tape, which is read out and amplified and applied to a discriminator circuit. The discriminator produces a D.-C. error voltage which varies in magnitude and polarity with changes in frequency of the reference signal in relation to a fixed predetermined frequency as determined by the tuning of the discriminator. The output of the discriminator is fed to a balanced modulator which is coupled to one winding of a two-phase servo motor. The resulting changes in torque of the servo motor produced by the output from the balanced modulator are used to correct for slight frequency shifts in the output reference signal so as to maintain the reference signal as derived from the tape at a substantially constant frequency.

Figure 1:
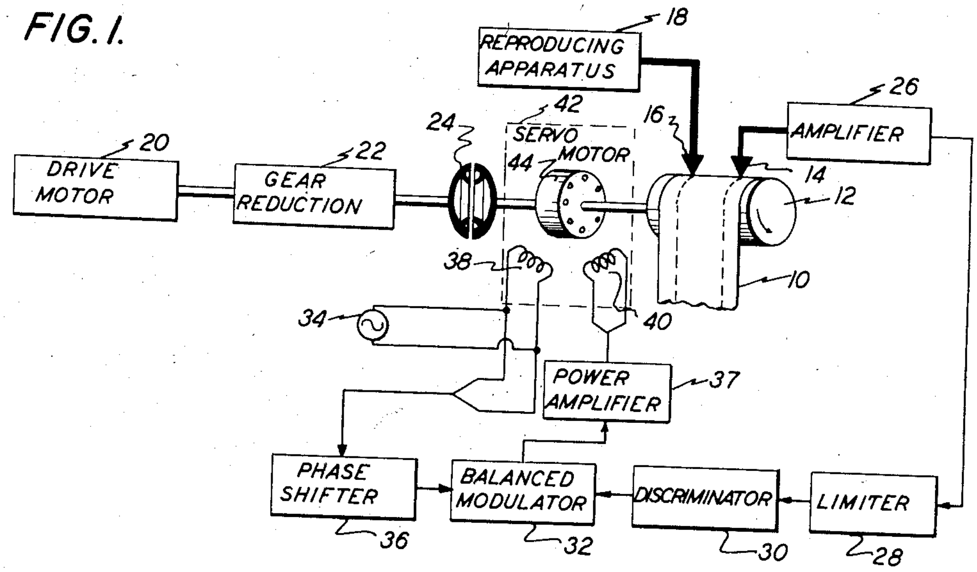
Figure 2:
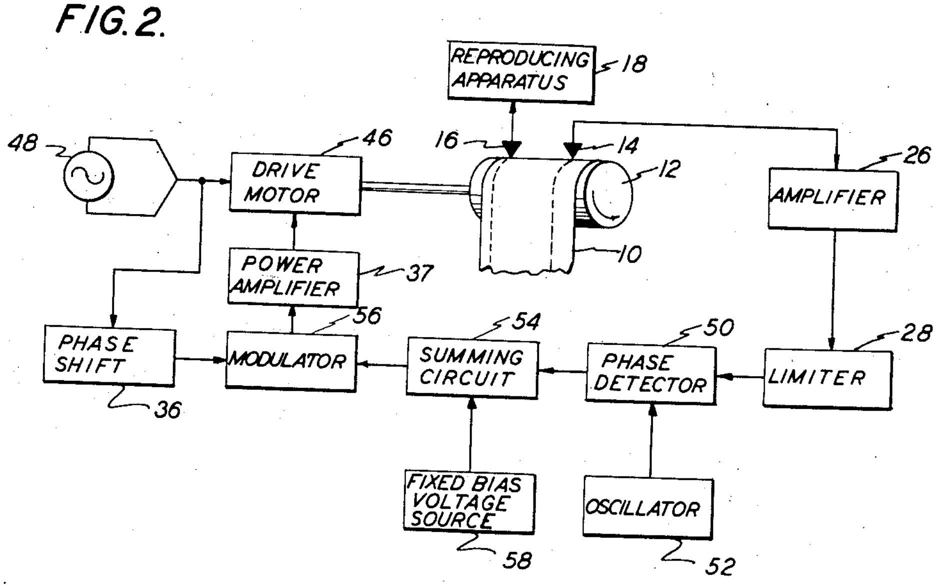

For a better understanding of the invention, reference should be had to the accompanying drawing wherein:

Fig. 1 is a block diagram showing one embodiment of a speed control apparatus according to the present invention; and Fig. 2 is an alternative embodiment of the invention.

Referring to Fig. 1 in detail, the numeral 10 indicates generally a magnetic tape which is driven by a rotatable capstan 12 past at least a pair of reading heads 14 and 16. The magnetic tape 10 has recorded thereon a plurality of information tracks, one of which contains a reference signal which was recorded on the tape at a fixed frequency. The information track read out by the reading head 16 goes to a suitable reproducing apparatus, indicated generally at 18, which serves to provide a record of the recorded information.

The capstan 12 is driven by a drive motor 20 which is geared down by a speed reducer 22 to drive the capstan at substantially the proper speed for accurate reproduction. The output from the speed reducer 22 is connected to the capstan through a fluid coupling or viscous clutch 24.

In order to maintain the output signal derived by the reading head 14 from the reference signal track on the magnetic tape 10 at a constant frequency, according to the present invention the output from the reading head 14 is applied to a suitable amplifier 26. The output from the amplifier 26 is passed through an amplitude limiter 28 and applied to a frequency discriminator circuit 30. The discriminator circuit 30 may be of the well-known Foster-Selley type circuit which produces a D.-C. output voltage which varies in magnitude and polarity as the frequency of the input varies above and below a center frequency determined by the tuning of the discriminator 30. Thus, the discriminator 30 produces an error voltage which canges in magnitude and polarity as the reference signal derived from the tape 10 shifts in frequency above and below a predetermined reference value, which reference value is made equal to the frequency used in recording the reference signal initially.

The output error voltage from the discriminator 30 is applied to a balanced modulator 32 to which is coupled a reference A.-C. signal, preferably of the order of 600 cycles, from a source 34 through a phase shifter 36.

The reference voltage source 34 and the output of the balanced modulator 32 are coupled, the latter through a power amplier 37, to a pair of windings 38 and 40 in a conventional two-phase servo motor 42. The rotor 44 of the servo motor 42 is arranged to drive the capstan 12 on the same shaft as the clutch 24. The phase shifter 36 is arranged to provide the necessary quadrature phase relationship between the respective alternating current signals applied to the two windings 38 and 40 of the servo motor 42.

Normally, power is applied only to the phase winding 38 when the output of the discriminator 30 is at zero voltage, as occurs when the tape 10 is being driven at the proper speed. If the speed of the tapes 10 deviates from the desired speed, the resulting frequency shift of the output from the reading head 14 produces an error voltage at the output of the discriminator 30, resulting in a signal being applied to the second phase winding 40 by the balanced modulator 32. The resulting torque produced by the servo motor 42 is applied in a direction to slow down or speed up the capstan 12 to correct for the change in frequency of the signal read out from the reference track. The fluid coupling 24 between the main drive motor 20 and the capstan 12 permits the servo motor to vary the speed of the capstan independently of the action of the drive motor 20.

The angular velocity of the capstan for driving the tape is low compared to the rated velocity of the servo motor 42. As a result the servo motor operates under a substantially stalled condition. Flutter or drift in the frequency of the tape reference signal causes a voltage to appear at the phase winding 40 which, due to the 600-cycle signal employed, almost instantaneously corrects the speed of the capstan to buck out any flutter components within the range of the servo system.

An alternative embodiment of the present invention is shown in Fig. 2. In this arrangement, the capstan 12 is directly driven by a two-phase drive motor 46 similar to but of higher torque than the servo motor 42 of Fig. 1. The drive motor 46 is connected to a suitable A.-C. voltage source 48 and to the output.

As in the circuit of Fig. 1, the output from the reading head 14 is amplified, and amplitude limited. The output of the limiter 28, rather than being applied to a discriminator, as in Fig. 1, may be applied to a conventional phase detector, as indicated at 50, to which is coupled a reference oscillator 52. The oscillator 52 is tuned to the desired frequency of the signal derived from the reference track on the tape 10. Any shift in frequency of the signal derived from the tape 10 results in a change in phase between the output of the limiter 28 and the signal from the oscillator 52, which change in phase produces a D.-C. error voltage on the output of the phase detector 50. The polarity and magnitude of the phase detector output is determined by the direction and extent the frequency of the signal derived from the reference track on the tape 10 changes with respect to the reference oscillator 52. Thus, the phase detector 50 and oscillator 52 effectively operate in the same manner as the discriminator 30 in Fig. 1 to produce an error voltage which may be used to correct the speed of the capstan 12 to maintain the frequency of the signal derived from the reference track on the tape 10 substantially constant.

The output from the phase detector 50 is coupled through a summing circuit 54 to a modulator 56. Also coupled to the summing circuit 54 is a fixed bias source 58. Thus, a constant voltage is applied to the modulator 56 which is increased or decreased in response to the error signal from the phase detector 50.

Also coupled to the modulator 56 is a modulating voltage derived from the source 48 through a phase shifter 60, the phase shifter 60 being provided to establish the necessary phase relationship between the respective inputs to the motor drive 46.

It will be seen that by virtue of the fixed bias voltage derived from the source 58, a contsant torque is applied to the drive motor 46. This torque is set at a value by proper adjustment of the magnitude of the fixed bias voltage so as to drive the capstan 12 nominally at the desired speed. By virtue of the servo loop including the phase detector 50, the torque of the drive motor 46 is increased or decreased in response to detected variations in the frequency of the reference signal derived from the tape. The direction and magnitude of the changes in torque of the drive motor 46 are such as to correct for the variations in the frequency of the reference signal derived from the tape, so as to maintain the drive of the tape at the required speed at all times.

It will be seen that in both the modifications of Fig. 1 and Fig. 2, an error signal is derived in response to changes in frequency of a reference signal with changes in speed of a tape. This error signal is applied through a modulator in both cases to modify the torque of a drive motor associated with the tape to instantaneously correct the speed of the tape 10 to maintain substantially constant frequency of the reference signal derived therefrom.

What is claimed is:

1. A constant speed tape control system comprising a magnetic tape having a continuous periodic signal recorded thereon, motor means for driving the tape, a two-phase servo motor coupled to the motor means driving the tape, transducer means for reading out the signal whereby the recorded signal is reproduced, a discriminator coupled to the transducer means for producing a signal that varies in magnitude with changes in frequency of the input, a balanced modulator coupled to the output of the discriminator, and means coupling the output of the modulator to one phase of the two-phase servo motor for varying the load on the motor means in response to the output of the balanced modulator to correct for any shift in frequency of the periodic signal read out from the tape.

2. Apparatus for controlling the speed of a driven member comprising means for generating a signal having a frequency proportional to the speed of the driven member, motor means for driving the member, a two-phase servo motor coupled to the driven member, a discriminator responsive to said signal, the discriminator producing an error signal that varies in magnitude with changes in frequency of the input about a predetermined reference frequency, a balanced modulator coupled to the output of the discriminator, and means coupling the output of the modulator to one phase-winding of the two-phase servo motor for varying the load on the motor means in response to the output of the modulator for correcting the speed of the driven member.

References Cited in the file of this patent

UNITED STATES PATENTS

| | | |
|---|---|---|
| 2,496,103 | Neufeld | Jan. 31, 1950 |
| 2,604,321 | Williams | July 22, 1952 |
| 2,627,596 | Andrews | Feb. 3, 1953 |
| 2,715,202 | Turner et al. | Aug. 9, 1955 |
| 2,774,927 | Evans | Dec. 18, 1956 |